No. 869,881. PATENTED NOV. 5, 1907.
D. M. DEARING.
MOTOR VEHICLE RUNNING GEAR.
APPLICATION FILED JULY 23, 1906.
3 SHEETS—SHEET 1.
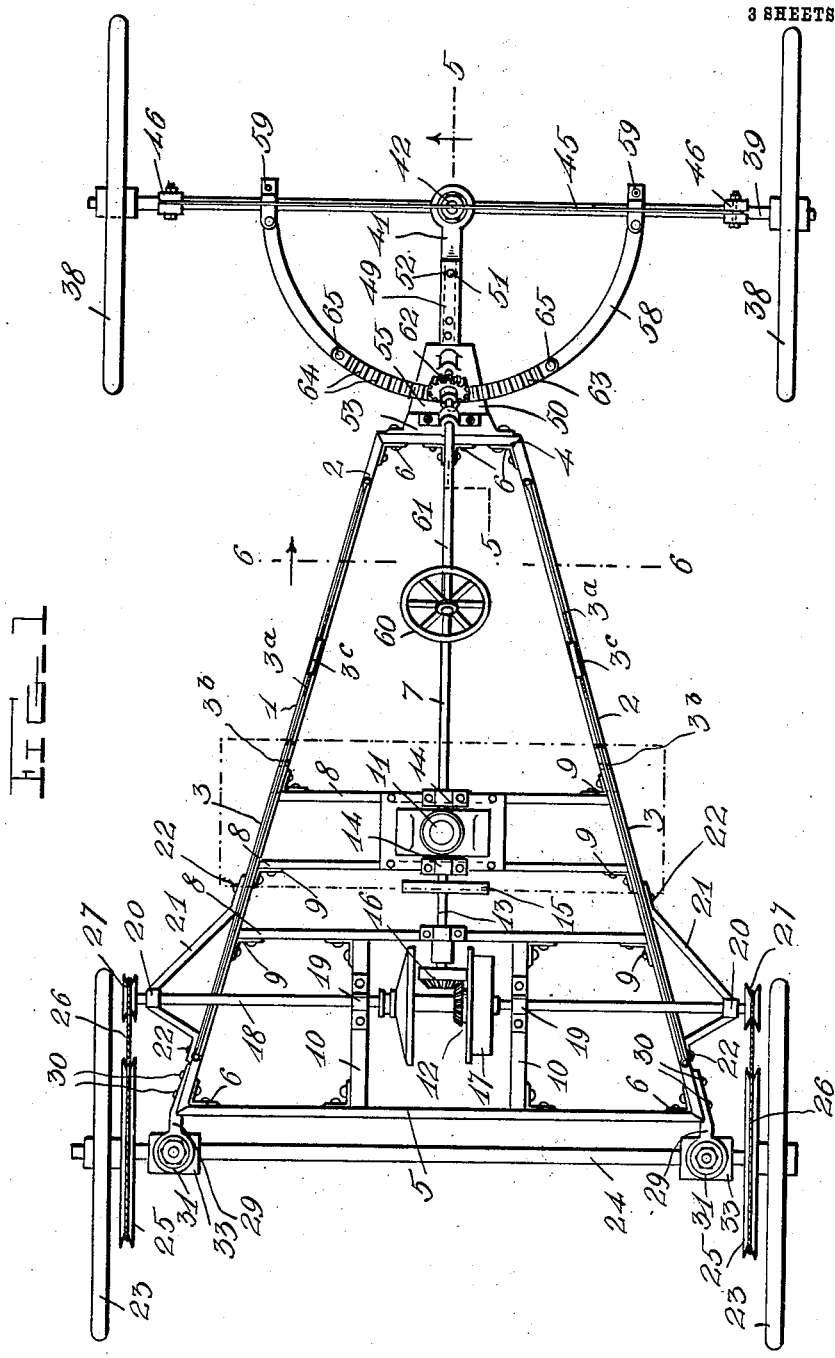
Witnesses
C. H. Griesbauer.
Inventor
D. M. Dearing
by H. B. Willson & Co.
Attorneys

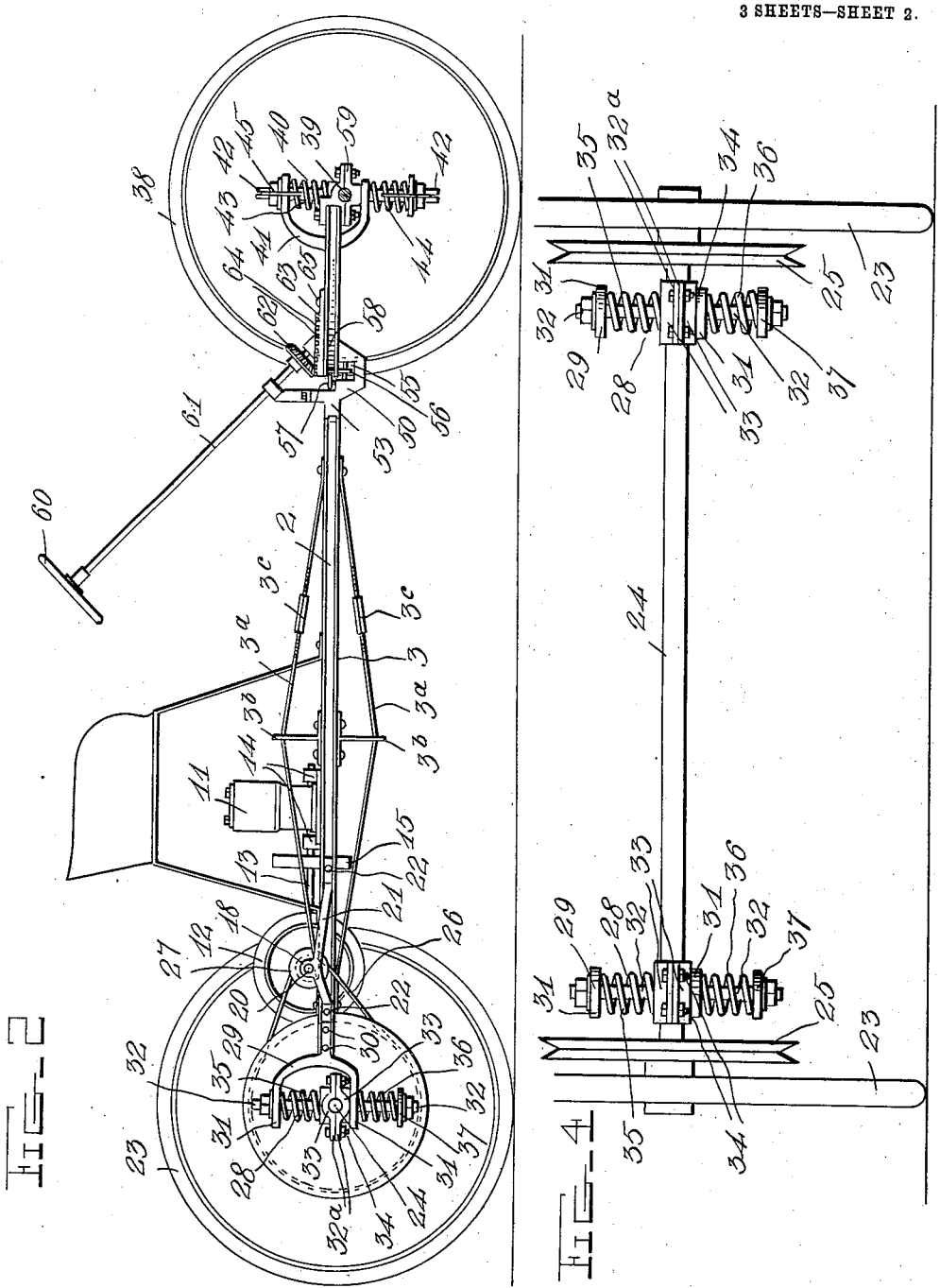

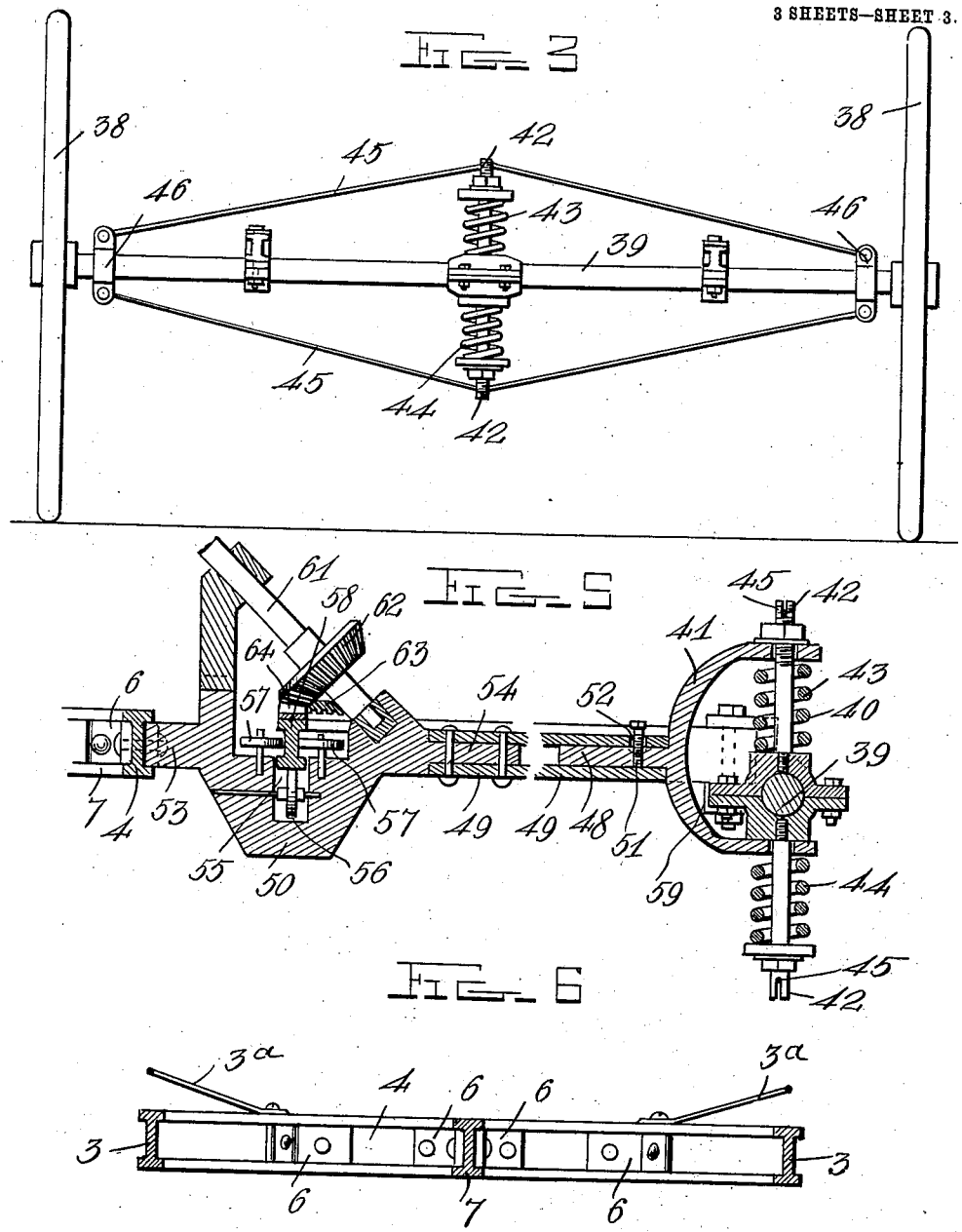

UNITED STATES PATENT OFFICE.

DAVID M. DEARING, OF JACKSON, MICHIGAN.

MOTOR-VEHICLE RUNNING-GEAR.

No. 869,881.   Specification of Letters Patent.   Patented Nov. 5, 1907.

Application filed July 23, 1906. Serial No. 327,421.

*To all whom it may concern:*

Be it known that I, DAVID M. DEARING, a citizen of the United States, residing at Jackson, in the county of Jackson and State of Michigan, have invented certain new and useful Improvements in Motor-Vehicle Running-Gears; and I do declare the following to be a full, clear, and exact description of the invention, such as will enable others skilled in the art to which it appertains to make and use the same.

My invention relates to improvements in the running gear of vehicles, particularly motor vehicles.

One object of the invention is to provide a running gear frame of this character, which will be extremely light and inexpensive, and at the same time strong, durable and efficient.

Another object of the invention is to provide a simple, strong and durable elastic or cushioned connection between the axles and the running gear frame of a vehicle.

A further object of the invention is to improve and simplify the construction of devices of this character, and thereby render the same more durable and less expensive.

With the above and other objects in view, the invention consists of certain novel features of construction, combination and arrangement of devices, as hereinafter described and claimed.

In the accompanying drawings,—Figure 1 is a top plan view of my improved running gear for motor vehicles or the like, the seat being indicated in dotted lines; Fig. 2 is a side elevation of the same; Fig. 3 is a front end elevation of the machine; Fig. 4 is a detail view of a portion of the rear end of the machine; Fig. 5 is a detail vertical longitudinal sectional view taken on the plane indicated by the line 5—5 in Fig. 1; and Fig. 6 is a vertical transverse sectional view taken on the plane indicated by the line 6—6 in Fig. 1.

Referring to the drawings by numeral, 1 denotes my improved vehicle running gear, which comprises a forwardly tapering or substantially triangular-shaped horizontal frame or body 2, consisting of forwardly converging side beams 3, connected at their ends by front and rear cross beams 4, 5. The beams 3, 4, 5, are preferably of channel or I-shape in cross-section and they are united at their beveled ends by angle-metal plates or straps 6, which are bolted, riveted or otherwise secured to the inner faces of the webs of the beams and between their inwardly-extending upper and lower flanges, as clearly shown in the drawings. The frame or body 2 has its longitudinal or side beams 3 connected at points intermediate their ends to transverse bars or beams 8, which latter have their ends secured to the webs of the beams 3 by angle plates or straps 9. The transverse bars 8 are preferably arranged in parallel relation, and between the rearmost one and the rear cross beam 5 are short parallel longitudinally-extending bars 10, also secured by angle plates, as shown. The foremost bar 8 is connected to the front cross beam 4 by a centrally-disposed longitudinal bar 7, which has its ends secured by angle plates. The longitudinal side beams 3 are preferably braced by upper and lower truss-rods $3^a$, which have their ends secured to the ends of the beams 3, and their central portion spaced from the upper rear faces of said beams by notched brackets $3^b$, as seen in Fig. 2. Turn-buckles $3^c$ are preferably provided in said truss-rods, so that they may be tightened or loosened, as desired. The bars 8 and 10 support a motor of any description, conventionally shown as at 11, and a variable-speed, power-transmission gear 12, which is driven by a longitudinally-extending shaft 13 of the motor. The shaft 13 is journaled in bearings 14 upon the forward transverse bars 8 and carries at its rear end a fly-wheel 15 and the driving member 16 of the variable-speed and reversing gear 12. The coacting driven member 17 of the gear or device 12 is mounted upon a transversely-extending countershaft 18, which is journaled in bearings 19 upon the longitudinal bars 10, and in bearings 20 provided in substantially V-shaped brackets 21, which are bolted or otherwise secured to the outer faces of the webs of the side beams 3, as shown at 22. The gear or device 12 may be of any desired form and construction, but I preferably employ the one set forth in an application for patent filed by me February 19, 1906, and bearing Serial No. 301,891. The motor 11 and the gear 12 is preferably covered by a seat of any form and construction, which is disposed above the same and suitably mounted upon the frame 1.

The rear of the running gear is supported upon drive wheels 23 journaled upon the outer ends of a rear stationary axle 24, and having upon their inner faces large grooved pulleys 25, adapted to be connected by driving belts 26 to small grooved pulleys 27 upon the ends of the countershaft 18. Any other suitable driving connection may be provided between the shaft 18 and the wheels 23. The running gear frame 1 is elastically or yieldably hung upon the axle 24 by cushioning devices 28, which comprise yokes or forked brackets 29, mounted at each of the rear corners of the frame 1. These yokes or brackets 29 have their inner ends bolted or otherwise secured, as at 30, to the outer faces of the webs of the side beams 3, and the arms 31 of their forked rear ends are apertured to receive vertically-extending guide pins 32, provided upon the axle 24. Each of these guides consists of similar upper and lower members 33, which are bolted together and upon the axle, as clearly shown in the drawings. Each of the members 33 consists of a pin 32 and a flanged semi-cylindrical base section $32^a$, which engages one-half of the shaft 24, and is secured thereon and to the corresponding section of the opposing member by rivets or bolts 34 passed through their flanges. The cushioning of the frame is effected preferably by pairs of coil springs 35, 36, which surround the pins 32, the upper spring 35 of each pair being confined between the base portion of the upper guide member 33 and the lower face of the upper arm of the fork or yoke 29, and the lower springs 36 are confined between the underside of the lower arms of said yokes or forks and the stops 37, which may be in the form of washers and nuts provided upon the lower or depending guide pins 32, as shown. The upper pins 32 are prevented from springing out of the upper arms of the yokes or brackets by similar washers and nuts, or by any other suitable stop devices.

The forward end of the running gear is supported by steering wheels 38, journaled upon a swinging front axle 39. The latter is pivotally mounted, to swing in a horizontal plane for the purpose of steering the vehicle, by means of a cushioning device 40, which is similar to one of the devices 28. This cushioning and pivoting device comprises a yoke 41, which has the arms of its forked forward end apertured to receive the vertically-projecting pins 42 of a guide which is constructed and secured to the center of the axle 39 similar to the guides upon the rear axle. The pins 42 turn freely in the openings in the yoke and form a king-bolt or pivot upon which the axle swings, and upper and lower cushioning springs 43, 44, are arranged upon said pins, as clearly shown in Fig. 5 of the drawings. Upon the front axle 39, I preferably provide upper and lower truss-rods 45, which extend from the ends of the pins 42 to lugs upon collars 46, secured adjacent to the ends of the axle 39, as clearly shown in Fig. 3 of the drawings. The cylindrical rear end 48 of the yoke 41 projects into and has a slight axial or rotary movement in the forward end of a reach bar 49, which has its rear end connected by a union or coupling 50 to the front cross beam 4 of the frame 1.
The end 48 of the yoke 41 is retained in the bore of the tube or bar 49, or in a socket in the same, by means of a pin 51, which extends through a transverse slot 52 in the tube or bar 49, and is screwed or otherwise secured in said end 48. This construction not only retains the yoke 41 in the tube 49, but permits the former to have a slight rotary movement to permit the front axle to tilt or swing slightly in a vertical transverse plane, and also permits the yoke 41 to have a slight longitudinal movement with reference to said tube. The union or coupling 50 is preferably in the form of a casting, which has a broad rear end 53, which is bolted or otherwise secured to the front face of the web of the front cross beam 4, and a reduced forward end or stem 54, which is bolted or otherwise secured in the rear end of the tube or bar
49. The central portion of the union or casting 50 is recessed in its top, as shown at 55, and contains a lower vertically-disposed roller 56 and a pair of upper horizontally-disposed rollers 57. These rollers are provided for the purpose of guiding a semi-circular bar or beam 58, which serves as both a steering bar and a hound for the front axle 39. This bar 58 is preferably in the form of a metal I-beam, bent into semi-circular form and having its ends secured by means of clips 59 to the axle 39 at equi-distant points from its pivot. The connections between the ends of said bar and said clips permit of slight vertical angular movement of said bar. The central portion of the bar 58 extends through the recess 55 in the casting or union 50, and the horizontal rollers 59 engage the opposite faces of its vertical web, while the vertical roller 56 engages its bottom, as shown in Fig. 5 of the drawings. The steering of the vehicle is effected by rotating a hand-wheel 60 upon the upper end of a forwardly and downwardly inclined shaft 61, which has its lower end journaled in the casting 50 and carrying a beveled pinion 62, which meshes with a steering gear plate 63 upon the upper face of the bar 58. This gear plate 63 is of segmental form, its curvature being concentric with that of the bar 58, and in its upper face are cut beveled rack teeth 54. It is secured upon the upper face of the bar 58 by pins, bolts or the like, 65, as shown. The bar 58 with its segment plate is permitted to rock somewhat with reference to the rollers 56, 57, and the gear 62, and accommodate itself to the vertical movement of the front end of the frame with reference to the front axle, under the play of the springs 43, 44.

The construction, use and advantages of the invention will be readily understood from the foregoing description, taken in connection with the accompanying drawings. It will be seen that this running gear is of extremely light, strong, and durable construction, and comparatively inexpensive to produce. The employment of the flanged beams and connecting them as shown, renders the frame very rigid and strong, and the mounting of the axles in the cushioning device dispenses with the necessity of the usual large body springs. The manner of mounting the steering axle dispenses with the necessity of a great number of parts and permits the steering bar to serve as a hound, as shown.

While I have shown and described the preferred embodiment of my invention, I desire it to be understood that I do not wish to be limited to the precise showing set forth, since various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is,—
1. A vehicle running gear frame comprising forwardly-converging, flanged side beams, front and rear flanged end beams, longitudinally and transversely-extending, intermediate bars, said beams being connected together and to said bars by angle plates secured to the inner faces of their webs between their upper and lower flanges, and cushioning devices for suspending said frame from front and rear axles.

2. A vehicle running gear frame comprising forwardly-converging, flanged side beams, front and rear flanged end beams, longitudinally and transversely-extending, intermediate bars, said beams being connected together and to said bars by angle plates secured to the inner faces of their webs between the upper and lower flanges, a reach bar or tube, a union between the latter and the forward end of the frame, means for mounting the rear end of said frame upon a rear axle, and a cushioning and pivoting device at the forward end of said reach bar for a front steering axle.

3. A vehicle running gear frame comprising forwardly-converging, flanged side beams, front and rear flanged end beams, longitudinally and transversely-extending, intermediate bars, said beams being connected together and to said bars by angle plates secured to the inner faces of their webs between the upper and lower flanges, a rear axle, means for connecting the rear end of the frame to said axle, a front steering axle, a reach bar or tube, a union connecting the latter to the front end of said frame, a front steering axle, a cushioning and pivoting device for the latter at the forward end of said reach bar, and a semi-circular bar connected to said front axle and slidable in said union, substantially as described.

4. A vehicle running gear frame comprising forwardly-converging, flanged side beams, front and rear flanged end beams, longitudinally and transversely-extending, intermediate bars, said beams being connected together and to said bars by angle plates secured to the inner faces of their webs between their upper and lower flanges, cushioning devices upon the rear of said frame, a rear axle mounted in said cushioning devices, a reach bar or tube, a union connecting the latter to the front end of said frame, a cushioning and pivoting device rotatably mounted in the forward end of said reach bar, a front axle pivotally mounted in said cushioning and pivoting device, guide rollers in said union, and a semi-circular bar slidably engaged with said rollers and having its ends connected to the front steering axle, substantially as shown and described.

5. In a vehicle running gear comprising a horizontally-disposed frame consisting of bars or beams connected by angle plates, cushioning devices for mounting a rear axle at the rear end of said frame, a reach bar or tube, a union connecting the latter to the front end of said frame, a front axle, a pivoting and cushioning device for the latter, rotatably mounted in the forward end of said reach bar, and a semi-circular bar slidable in said union and having its ends connected to said front axle, substantially as described.

6. In a vehicle running gear, the combination of a reach bar having a tubular portion at its forward end, an axle-pivoting device having its rear end rotatable in the tubular end of said reach bar, and a transverse pin carried by the rear end of said device and projecting into a transverse slot in said reach bar, substantially as described and for the purpose set forth.

7. In combination with a vehicle running gear frame, a yoke on said frame and having forwardly-extending arms, one above the other, an axle having its central portion between said arms, a guide on said axle having vertically-projecting, alined pins extending through openings in the arms of said yoke, and cushions on said guide pins, substantially as described.

8. The combination with a vehicle running gear frame, of yokes or forked brackets secured upon said frame and having their arms apertured, an axle, guides secured upon said axle and consisting of similar upper and lower members having pins to slidably engage the apertures in the arms of said yokes, and base plates to engage said axles, and cushioning springs upon said pins, substantially as shown and described.

In testimony whereof I have hereunto set my hand in presence of two subscribing witnesses.

DAVID M. DEARING.

Witnesses:
CHRISTIE A. STEARNS,
FRANK EGGLESTON.